United States Patent [19]

Ho

[11] 4,107,748
[45] Aug. 15, 1978

[54] RECORDING HEAD SUPPORT ASSEMBLY

[75] Inventor: Bin-Lun Ho, Los Gatos, Calif.

[73] Assignee: Memorex Corporation, Santa Clara, Calif.

[21] Appl. No.: 801,648

[22] Filed: May 31, 1977

[51] Int. Cl.² .................... G11B 21/16; G11B 5/48
[52] U.S. Cl. ................................................. 360/104
[58] Field of Search .................... 360/104, 103, 105

[56] References Cited

U.S. PATENT DOCUMENTS

| | | | |
|---|---|---|---|
| 3,480,936 | 11/1969 | Gerlach et al. | 360/103 |
| 3,665,434 | 5/1972 | Applequist et al. | 360/103 |
| 3,931,641 | 1/1976 | Watrous | 360/103 |
| 3,984,872 | 10/1976 | Beecroft | 360/103 |
| 4,019,205 | 4/1977 | Salmond et al. | 360/105 |

OTHER PUBLICATIONS

Luoma et al., "Elastomer Crash Stop for Disk Files", I.B.M. Tech. Disc. Bull., vol. 19, No. 8, Jan. 1977, p. 3175.

Primary Examiner—Robert S. Tupper

[57] ABSTRACT

A recording head support assembly for use on a high density, direct access data storage device, the head support assembly having multiple arms rigidly interconnected in bank and attached to an actuator mechanism, and having at least one magnetic head flexibly mounted to each arm by a localized spring assembly for reduction of tolerances and maintenance of alignment.

3 Claims, 6 Drawing Figures

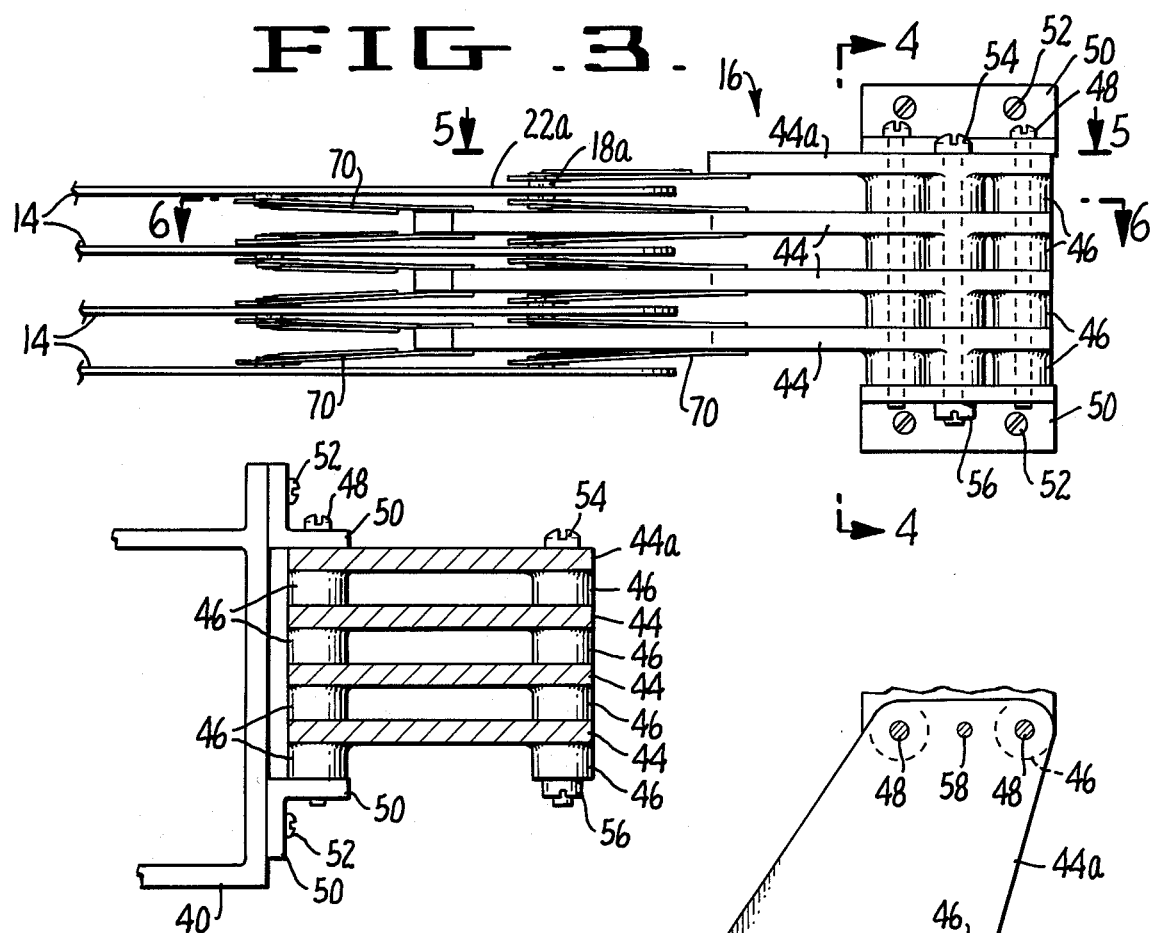

RECORDING HEAD SUPPORT ASSEMBLY

BACKGROUND OF THE INVENTION

This invention relates to the field of electrical communications and more particularly to magnetic disc storage systems. The invention specifically relates to a magnetic headarm support assembly for a random access disc file device. The support assembly is devised for use in a high density, hermetically sealed, fixed disc system for supporting low mass head assemblies, and is designed to minimize tolerances and maximize alignment capabilities for compatibility with new high density recording surfaces.

Disc storage devices were developed for the advantage of large capacity data storage with a random access retrieval that was high speed in comparison with the previously used medium of magnetic tape. Since their introduction in the 1950's, disc drive systems have evolved from fixed disc systems with low disc bit densities and relatively large access times to systems with removable disc arrays or packs having relatively high disc bit density and minimal access times. However, because of the very interchangeability nature of the disc pack file systems, the technological advances in component parts of the system no longer had any substantial effect on increasing bit densities. Interchangeability introduced unavoidable large tolerances which greatly exceeded the refined tolerance capabilities of individual components. Further, exposure of the disc storage medium to the environment during interchanges resulted in a contamination of both the disc surfaces and the operating environment within the file, increasing the potential of head contact with the disc as well as spot losses of information, thereby necessitating operation at less than optimum capabilities with regard to bit density packing and head flying heights.

Recent developments have indicated the desirability of returning to the fixed disc type of disc drive system. For example, to solve the contamination problem the disc array or pack has, in one prior art device, been enclosed in a hermetically sealed cartridge together with an accompanying head-arm assembly which is then connectable to a drive device. Because of the increased size and complexity of the pack assembly, as well as its costs, the goal of the inexpensive, interchangeable pack concept was greatly compromised by this arrangement. In fact, there was little advantage over a full swing return to a fixed disc drive.

Unlike the early fixed disc drives, newly devised fixed disc systems incorporated advanced disc coating, disc surface finishing and recording head technologies. By utilizing a hermetically sealed enclosure, the respective technology advances are optimized in a contamination free environment.

The present invention is directed to a head-arm support assembly having a precision that is compatible with the advances in recording head and disc components.

SUMMARY OF THE INVENTION

The head-arm support assembly of this invention is designed to optimize the use of low mass, low load recording heads in conjunction with a rotary actuator system. The use of a low mass, low load recording head allows a low flying height in the order of 20 microinches. This extremely low flying height in turn allows for greater bit densities and improved recording performance. In order to attain such a low flying height without unwanted contact between head and disc, the recording head must be highly compliant. Such compliance is achieved through a combination of the low mass/low load characteristics of the recording head, and a highly sensitive, localized spring assembly supporting and loading the recording head. By localizing the support and loading structure close to the recording head, positional deviations, arising from fabrication imperfections or operational influences, are not multiplied by a moment arm effect as is present in customary assemblies where the loading member is separated a substantial distance from the recording head by an imperfectly rigid arm extension. Additionally, greater sensitivity over the force of loading is achievable by a loading assembly directly coupled to the recording head. In effect, the dynamic support and load system must be concomitantly miniaturized proportionally to the smaller, low mass, advanced recording head. Since the overall diameter of the recording disc is essentially the same as in prior systems, the requirement of fully accessing the disc surface remains. By utilizing a rigid arm extension, the support and load system can be conveniently localized at the site of the recording head. The recording head is thereby minimally affected by interferences, flexural and vibrational, introduced from the usual semi-rigid extension arm, flexibly connected at the juncture with the actuator mount for the head-arm assemblies as in prior systems.

The head-arm support assembly of this invention is constructed with a plurality of wide, flat arm members with distal ends that enter the disc array and base ends that extend in the direction of the rotary actuator pivot point and are interconnected in bank by a three point bolting configuration to insure that the arm members are both rigid and integrally fixed in arrangement to maintain a fine tolerance level. The arrangement substantially reduces the rotary inertia of the moving member, thereby increases the speed and reduces the size of the overall package. The bank of arm members is directionally connected to the actuator arm, thereby dispensing with tolerance generating T-blocks and carriage systems of prior devices. At the distal end of the rigid arm member and, in the preferred embodiment, at a location midway on the arm member, a pair of recording heads are each connected to the arm member by a spring assembly. Each of the two spring assemblies includes a leaf spring support having a peripheral frame portion around the recording head to which the recording head is spot connected. This configuration allows for roll and pitch of the head during flight to conform to imperfections in the surface of the disc. The head is urged toward the disc by a separate tine of the leaf spring support which urges the head against the disc with a predetermined bias. The base end of the leaf spring support is fixedly connected to the rigid arm member. The lead spring arrangement comprises a relatively short extension to the rigid arm member completing as direct a connection as possible of the recording head with the actuator drive mechanism. In the preferred embodiment, the drive mechanism comprises an electromechanical rotary actuator which is servo operated from a closed loop servo system utilizing a track following servo head. This precise alignment of heads is not required and once the head-arm assemblies are interconnected in an integral fixed bank, the relative head positions are fixed and no further alignment is necessary. When used in a sealed or closed environment, the high bit densities necessary to reduce the cost for megabyte are achieved.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 3 is a side elevational view of the head-arm assembly and a portion of a recording disc array;

FIG. 4 is a cross-sectional view taken on the lines 4—4 in FIG. 3;

FIG. 5 is a cross-sectional view taken on the lines 5—5 in FIG. 3;

FIG. 6 is a cross-sectional view taken on the lines 6—6 in FIG. 3.

DETAILED DESCRIPTION OF THE PREFERRED EMBODIMENTS

The recording head support assembly of this invention is incorporated in a direct access data storage device of the disc drive type.

Figure 1:
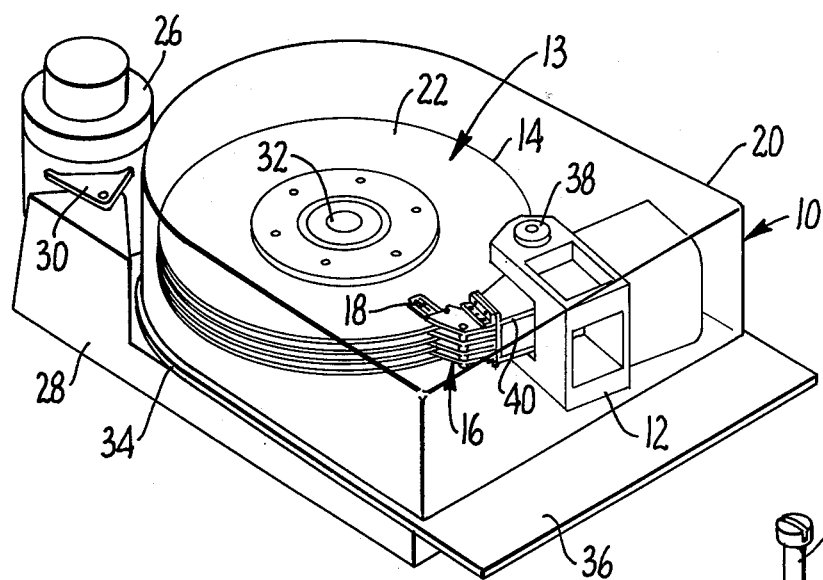
FIG. 1 is a perspective view of a disc drive unit and including the head-arm assembly.

In the preferred embodiment shown in FIG. 1, a disc drive 10 having a rotary accessing actuator 12 to mechanically access the surfaces of a stacked array 13 of spaced magnetic storage discs 14 utilize the devised head support assembly 16 to support and transport a plurality of recording heads 18 (shown in greater detail in FIGS. 3, 5 and 6) over the surfaces of the discs. In the drive device 10 of FIG. 1, the storage discs 14, actuator 12 and head support assembly 16 are sealed in an enclosure casing 20 which cooperates with a closed loop filter system (not shown) to provide a contamination-free environment for the sensitive components of the drive device, in particular, the disc surfaces 22 and the slide surfaces 24 (FIGS. 5 and 6) of the recording head 18.

External of the enclosure casing 20 is a drive motor 26 which is mounted on a base frame 28 by a belt tension adjustment bracket 30. The drive motor 26 is belt connected to the spindle 32 of the storage discs 14 under a deck plate 34 for the actuator 12 and disc array 13. In the embodiment shown, the deck plate 34 with mounted components is removable from the base frame for field replacement if necessary. Control electronics (not shown) may be conveniently carried on circuit cards on the deck plate extension 36.

The actuator 12 is a magnetic field actuator operating off a pivot post 38 to pivot an actuator arm 40 toward and away from the disc array 13 in response to servo control signals and command signals. The head support assembly, rigidly connected to the actuator arm transmits the actuator arm movement to the component recording heads for displacement and positional location of the heads over the disc surfaces.

Figure 2:
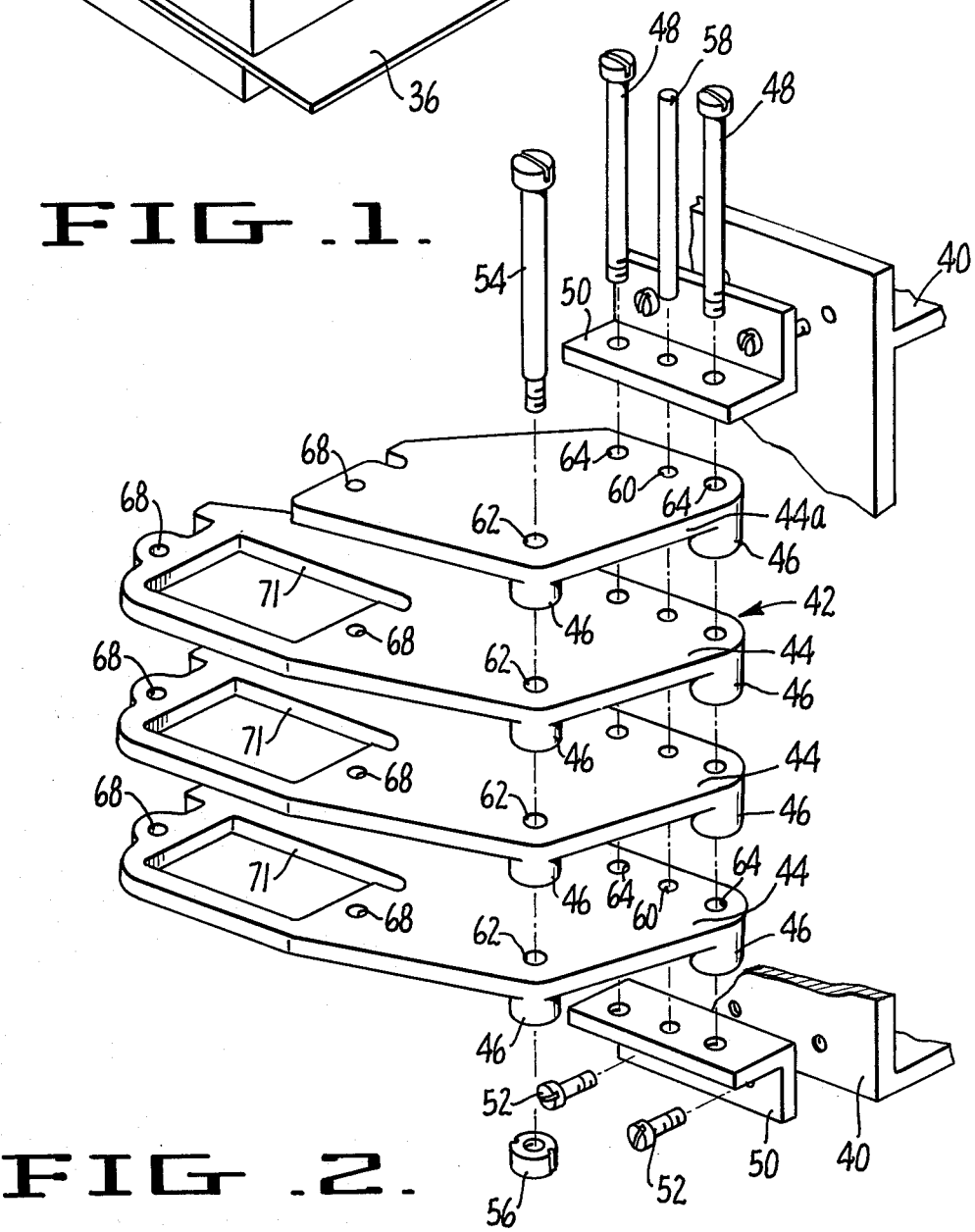
FIG. 2 is an exploded view of the head-arm assembly.

Referring to FIG. 2, an exploded view of the extension arm component of the head support assembly is shown. The extension arm component comprises a plurality of inflexible extension arms 44 separated by spacers 46 and rigidly interconnected by mounting bolts 48 and brackets 50. The extension arms are shaped towards the pivot 38 of FIG. 1 to substantially reduce the effective inertia of the head support assembly. The brackets are fastened to the actuator arm by machine screws 52. An additional alignment bolt 54 with accompanying nut 56 provides a three point clamping and bracing function uniting the arms into an integral rigid bank as shown in FIGS. 3 and 4. The extension arms are wide and flat with a sufficient thickness to make them virtually inflexible, particularly when intercoupled. The arms are accurately aligned during assembly by an alignment pin 58 coacting with the alignment bolt 54. Holes 60 and 62 for the alignment pin 58 and alignment bolt 54, respectively, are more accurately machined than the bracket holes 64 at the actuator arm interconnection. Once assembled, adjustments are not required.

The uppermost extension arm 44a supports only a single recording head which comprises a servoing transducer for the bank of recording heads, and therefore, is shorter than the remaining arms 44 which support four recording heads on each arm as shown in greater detail in FIGS. 3, 5 and 6. Mounting holes 68 for the cantilever mounting of the spring assemblies for the recording transducers are located at the ends of the arms and at a point approximately midway on the arms.

The spring assemblies 70, shown in FIGS. 3, 5 and 6, are mounted to the arms 44 and project from the end of the arms or in the lower arms, over a cutout 71.

In the preferred embodiment as shown in FIG. 3, four magnetic storage discs 14 are accessed on six of the eight available surfaces. As noted above, the top surface 22a is accessed by a single recording head 18a, which in actuality is a servo head operating in conjunction with prerecorded servo tracks on a portion of the disc surface. Since the data storage surfaces 22 of the remaining discs are each accessed half by the forward or innermost heads and half by the rear or outermost heads, the stroke of the actuator arm and hence the head support assembly is only half of the available width of the recording surface. With the shorter seek, access time can be substantially reduced.

The servo tracks necessary to perform the accessing of the entire recording surface are thus confined to the outer half of the recording surface. Since the recording heads operate in bank, and since the recording discs are fixed and not in a removable pack, the heads need not be aligned with respect to one another with the precision of heads in a removable media system, particularly one not using a servo track positioning format. Thus, once the heads are fixed in position during assembly of the head support assembly, no further alignment is necessary.

The spring assemblies 70 comprise a head support leaf spring 72, stamped out in the intricate integral pattern shown in FIGS. 5 and 6. The leaf spring has a bifurcated extending support segment 72a which bracket a rectangular, flexure segment 72b arranged around the periphery of the rectangular recording head 18, and, a central extending load segment 72c, with a rigid extension 73 providing a load contact with the recording head 18. The recording head is affixed to a cross segment 72d of the flexure segment 72b allowing a restrained pitch and roll movement to the recording head 18 or in the case of FIG. 5, the servo head 18a. The load segment 72c urges the heads toward the disc and essentially compromises a leaf spring having a predetermined loading force when flexed by the arrangement of its mounting to the extension 73 and engagement with a load button 74 (in phantom) on the recording heads. The leaf springs 72 are fastened to the extension arm by a rivet section 76 which fixes the position of the recording head with respect to the other recording heads, including the servo head.

Because of advanced disc surface compositions and coatings, the low mass heads (approximately a quarter gram) and low loading forces (approximately 10 grams) enable the heads to start and stop from rest positions on a disc surface without damage to head or disc, thus dispensing with complex loading mechanisms found in convention prior systems.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. A recording head support assembly supporting and loading recording head slider elements for use on magnetic storage discs on a high density, direct access data storage device having an actuator with a movable armature, the support assembly comprising:
   a plurality of flat, rigid arm members each having a configuration with a distal end projecting in part over the surface of a magnetic storage disc;
   means for rigidly interconnecting said plural arm members in stacked, spaced relationship to define a unitary extension arm component, whereby the relative spacings and positioning of the rigid arm members are maintained within that extension arm component;
   means for remvovably attaching said unitary extension arm component to said actuator armature; and
   at least one first flat leaf spring means attached to each said rigid arm member for supporting and loading a slider element over a disc, said spring means having its base end fixedly attached to the distal end of said rigid arm member, said leaf spring means including a bifurcated support element having distal ends extending from the base of said leaf spring means, a flexure element connected to the distal ends of the support element and having means for connecting said flexure element to the slider element, and a loading element having means for engaging the head slider element and loading the head slider element with the predetermined loading force when the slider element is flying over a disc.

2. The head support assembly of claim 1 wherein said rigid arm members include said means for maintaining said predetermined spacing when said rigid arm members are rigidly interconnected to form said extension arm component.

3. The head support assembly of claim 2 wherein said means for rigidly interconnecting said rigid arm members comprises at least two spaced bolts connecting said arm members to one another and to means removably attachable to said actuator arm, and a third bolt spaced from said two bolts and said mounting means.

* * * * *